Dec. 5, 1967   E. H. ISAACKS   3,356,185
SHOPPING CART BRAKE

Filed Sept. 22, 1966   2 Sheets-Sheet 1

INVENTOR
ELMER H. ISAACKS
BY Cullen, Sloman, & Cantor
ATTORNEYS

Dec. 5, 1967   E. H. ISAACKS   3,356,185
SHOPPING CART BRAKE
Filed Sept. 22, 1966   2 Sheets-Sheet 2

INVENTOR
ELMER H. ISAACKS

BY *Sullen, Sloman, & Cantor*

ATTORNEYS

United States Patent Office 3,356,185
Patented Dec. 5, 1967

3,356,185
SHOPPING CART BRAKE
Elmer H. Isaacks, 13950 Westbrook,
Detroit, Mich. 48238
Filed Sept. 22, 1966, Ser. No. 581,353
4 Claims. (Cl. 188—31)

This invention relates to shopping carts, and more particularly to a means for preventing theft or removal of such carts beyond an authorized area.

The increased use of wheeled shopping carts made available to patrons for their use in self-service type stores has created both a practical problem and an economic loss for the owners of such stores, in that the cart users occasionally remove the carts from the store premises and do not return them.

It is therefore the principal object of this invention to provide a means for economically and reliably preventing the unauthorized removal of wheeled shopping carts from within a predetermined area surrounding the store.

Briefly, the object of this invention is achieved by the provision of a telescoping wheel support structure which activates a cart disabling means in response to an attempted traversal of a predetermined discontinuity in the surface over which the cart rolls. This is achieved by providing either a raised curb or a shallow trench or gutter in the pavement surrounding the zone of permissible use of the cart. When the shopping cart is either tilted or rocked in an attempt to negotiate the curb, or when the wheel passes over the depression or trench in the pavement, the weight of the momentarily unsupported wheel structure causes it to telescope or extend and thereby actuate the disabling means.

This and other objects of this invention will become more apparent by reference to the following specification and accompanying drawings.

Figure 1:
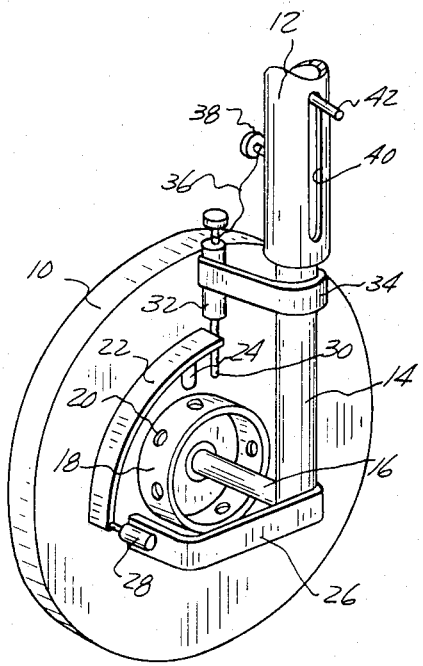
FIG. 1 is a perspective view of a cart wheel embodying one form of brake.

Referring now to FIG. 1 in particular, there is shown a wheel 10 of a shopping cart which is connected to a fixed leg 12 (only the lower portion of which is shown) of the cart by means of inner shaft 14 and axle 16 rigidly secured to shaft 14. Inner shaft 14 is adapted to telescope or slide within the hollow fixed leg of the cart.

The braking mechanism comprises a circular braking collar 18 concentric with and fixed to the face of wheel 10 and provided with a plurality of spaced holes 20. A locking arm 22 carrying locking pin 24 is secured to locking arm bracket 26 by means of a pivotable connection 28. Bracket 26 in turn is rigidly secured to the lower end of inner shaft 14. The pivotal connection 28 between arm 22 and bracket 23 may be in the form of a torsional spring which biases locking arm 22 downward toward braking collar 18. Alternatively, arm 22 may either be a leaf spring or it may be biased by means of a tension spring connected between arm 22 and bracket 26.

Resisting the downward bias on locking arm 22 is a retaining pin 30 which is slidably mounted along a vertical axis in sleeve 32 which is spaced outwardly from and rigidly secured to inner shaft 14 by means of retaining pin bracket 34. One end of a release wire 36 is looped around the head of retaining pin 30 and the other end of wire 36 is looped around a release wire pin 38 secured to cart leg 12.

To maintain wheel 10 in alignment with the cart, a slot 40 is provided in the side of cart leg 12, and an aligning pin 42 secured to inner shaft 14 is adapted to protrude through the slot. In this manner, the wheel is held straight, and the vertical travel of the wheel relative to the fixed cart leg 12 is limited by the stroke of pin 42 between the ends of the slot. Alternatively, a caster type of wheel mounting could be provided for this purpose.

The actuating of the brake is accomplished by producing an extension of inner shaft 14 relative to cart leg 12. This can be achieved in a number of ways. A raised curb could be provided surrounding the unloading and loading zone or parking lot of the store, for example. The curb could be made flexible or deformable, so that an automobile could readily traverse it by flattening it, but the shopping basket weight would not be sufficient to flatten the curb.

Figure 7:
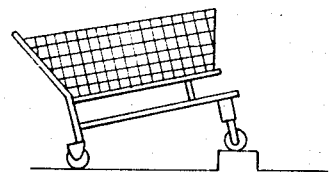
FIG. 7 is a side elevation of a shopping cart equipped with this invention and negotiating a curb.

To traverse an elevated curb, as in FIG. 7, a person pushing a shopping basket would naturally tend to rock or tilt the basket up on two wheels much as would be done in climbing a curb with a baby carriage. When this is done, the wheel and inner shaft assembly at the elevated end of the cart would, by their own weight, tend to fall as soon as they lost contact with the ground or the weight of the cart removed from that particular wheel assembly. Thus, as the cart and leg 12 were rocked upward, there would be relative movement between inner shaft 14 and leg 12. As this occurred the slack in release wire 36 would gradually be taken up until finally locking arm 22 would be released. Arm 22 would then be driven downwardly under its biasing force and locking pin 24 would enter and engage one of the braking holes 20 in collar 18. This action would render the cart immovable by rolling.

Figure 8:
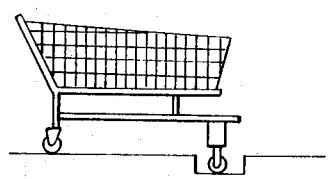
FIG. 8 is a view similar to FIG. 7 showing the cart negotiating a trench.

Alternatively, a shallow trench could be formed on the border of the area of authorized use of the cart, as shown in FIG. 8, which trench would neither be deep enough nor wide enough to interfere with the movement of automobiles in and out of the parking lot, but which would be large enough to cause the wheel of a shopping cart to drop into it as one attempted to traverse it. Such a trench would similarly result in actuation of the brake mechanism of FIG. 1 as described above.

Figure 2:
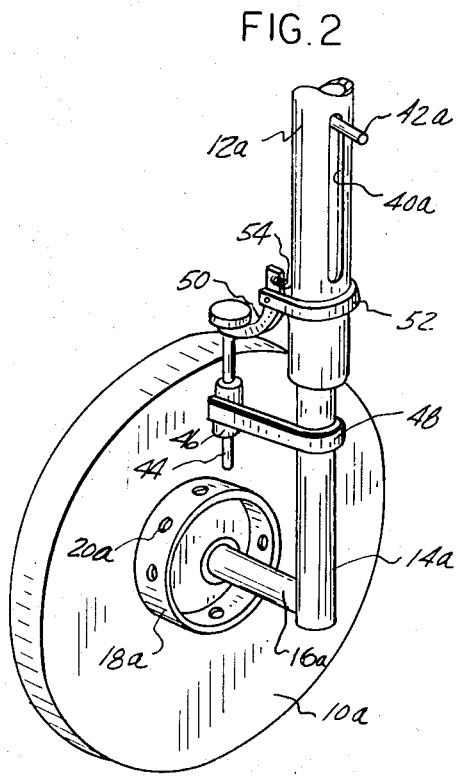
FIG. 2 is a view similar to FIG. 1, but showing a first brake modification.

Referring now to the embodiment of FIG. 2, the structure is substantially similar with the exception of the brake mechanism. Braking collar 18a is identical with that of the embodiment of FIG. 1, but in place of locking arm 22 there is provided a locking pin 44 slidably received by locking pin sleeve 46 which is secured to inner shaft 14a by bracket 48. Locking pin 44 is retained in its upward disengaged position by a forked retaining lever 50 pivotally mounted to a bracket 52 secured to leg 12a. Retaining lever 50 is J-shaped and is adapted to hook under the head of locking pin 44 to prevent the pin from dropping into engagement with the braking collar 18a. Retaining lever 50 is biased by a spring 54 so as to remain in engagement with the pin. Pin 44 would further be provided with a stop which would prevent it from being withdrawn upwardly out of sleeve 46 beyond the position illustrated.

In operation of the embodiment of FIG. 2, when the cart is maneuvered in such a fashion as to initiate the extension of inner shaft 14a from leg 12a, the locking pin assembly moves downwardly relative to retaining lever 50, camming the lever against the bias of spring 54 until the lever finally releases pin 44 and allows it to drop into engagement with one of the locking holes 20a of braking collar 18a. Wheel 10a is thus locked against any further rotation.

Figure 3:
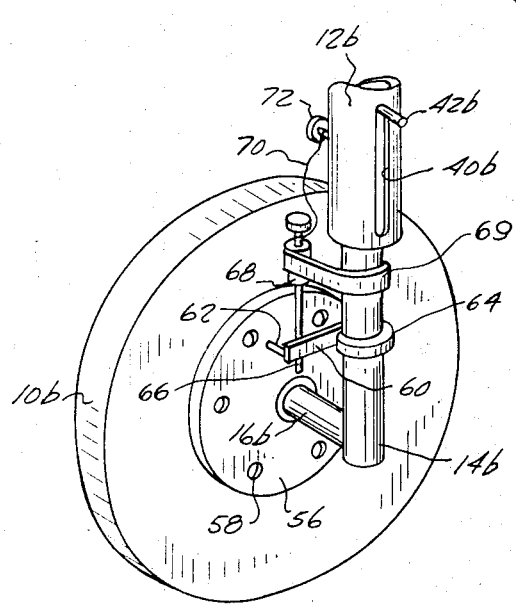
FIG. 3 is a view similar to FIG. 1, showing a second modification of the brake.

Referring now to the embodiment of FIG. 3, a braking disk 56 is provided in a plane parallel to that of wheel 10b in place of the braking collar of the embodiments of FIGS. 1 and 2. Disk 56 is provided with a plurality of spaced holes 58. A locking arm 60 having at its outer end a locking pin 62 is secured to locking arm bracket 64 which in turn is fixed to the lower portion of inner shaft 14b. Locking arm 60 may be fabricated of a leaf spring material to provide a bias toward engagement with disk 56, or alternatively a compression spring may be mounted between it and inner shaft 14b.

Locking arm 60 is maintained in its withdrawn disengaged position against the bias of the biasing means by retaining pin 66 which is vertically slidably mounted in retaining pin sleeve 68 secured to inner shaft 14b by bracket 69. The release mechanism is similar to that provided in the embodiment of FIG. 1, in that a wire 70 is secured at one end to the head of retaining pin 66 and at the other end to a release wire pin 72 secured to leg 12b.

In operation of the embodiment of FIG. 3, a telescoping of inner shaft 14b from leg 12b caused by the above described maneuvering of the cart causes retaining pin 66 to be pulled upwardly by release wire 70 until it releases locking arm 60, which under the influence of its biasing means moves toward braking disk 56. The braking action is thus accomplished by the insertion of pin 62 into one of the braking disk holes 58.

It is to be understood that each of the embodiments of FIGS. 1–3 would be suitably enclosed by shielding so as to prevent tampering by unauthorized persons.

Figure 4:
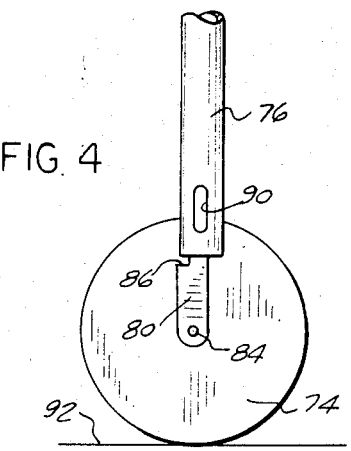
FIG. 4 is a side elevational view of a cart wheel embodying still another type of disabling means.
Figure 5:
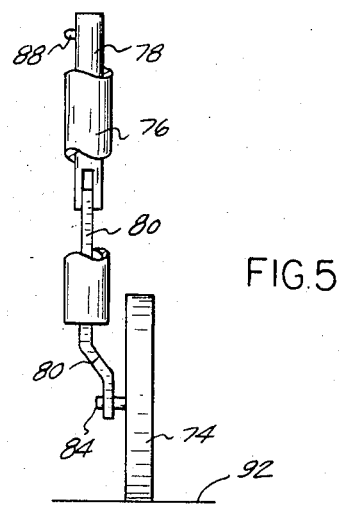
FIG. 5 is a fragmented front view of the device of FIG. 4.
Figure 6:
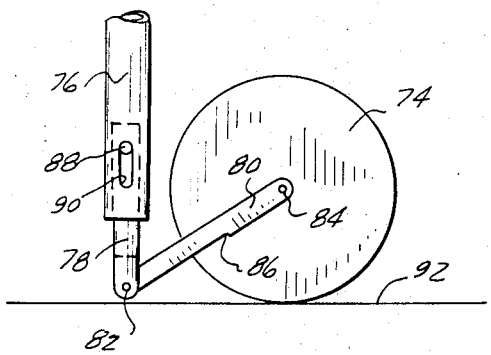
FIG. 6 is a view similar to FIG. 4, but showing the device in its collapsed condition.

The embodiment illustrated in FIGS. 4 through 6 utilizes a slightly indifferent concept from the above described embodiments of FIGS. 1 to 3. Although the action is initiated by the telescoping of the leg, the cart is disabled rather than braked. This embodiment comprises a wheel 74, a cart leg 76 forming a fixed portion of the cart, a cylindrical inner shaft 78 adapted to reciprocate inside hollow leg 76, and a connecting link 80 pivotally connected to the forked end portion of shaft 78 by pivot pin 82. Wheel 74 is rotatably secured to the lower end of connecting link 80 by axle 84.

As can be seen in FIGS. 4 and 6, connecting link 80 is provided with a shoulder 86, which during the normal operation of the cart abuts the lower end of cart leg 76, as shown in FIG. 4, and thereby supports the weight of the cart.

Inner shaft 78 is provided near its upper portion with a detent pin 88 which is biased outwardly but which is normally held in its inward position by contact with the inner periphery of hollow leg 76. When inner shaft 78 telescopes downwardly relative to leg 76, the detent pin 88 comes into registry with slot 90 and is then free to move outwardly and lock inner shaft 78 against any further upward or downward longitudinal movement.

The surface on which the cart rolls is represented by line 92 in the figures.

In the operation of the embodiment of FIGS. 4 through 6, when the shopping cart is maneuvered so as to initiate extension of wheel 74 and its supporting structure relative to cart leg 76, inner shaft 78 and connecting link 80 slide downwardly within the bore of leg 76 until pivot pin 82 passes outside the lower end of leg 76. Once this joint is free of the lateral support provided by the inner bore of leg 76, the wheel 74 collapses relative to the cart, and the lower end of inner shaft 78 scrapes along the ground and the basket assumes a disabled condition. Simultaneously, detent 88 comes into registry with slot 90 and locks the wheel supporting structure against any further movement so that the wheel assembly cannot be returned to its normal configuration. Of course, this portion of the structure would be suitably housed to prevent tampering by unauthorized persons.

The disabling mechanisms of the various described embodiments might be applied to one or more wheels of a cart, it being understood that one disabled wheel would be sufficient to accomplish the stated objective.

This invention may be further developed within the scope of the following claims. Accordingly, the above specification is to be interpreted as illustrative of only a few operative embodiments, rather than in a strictly limited sense.

I now claim:

1. In a shopping cart characterized by a wheeled frame and a basket fixed to the frame, the improved means for disabling the cart from further wheeled motion in response to the traversing by the cart of a predetermined abrupt discontinuity in the elevation of the rolling surface comprising:

a hollow vertical leg fixed to the cart frame and being open at its lower end;

a vertical inner member means freely slidably mounted for longitudinal movement between predetermined limits within said hollow leg and having a portion extending through and below said open lower end of said hollow leg;

axle means fixed to the lower end of said inner member means for rotatably supporting a cart wheel;

and disabling means responsive to the telescoping movement of said inner member means relative to said hollow leg initiated by an attempted traversal of the rolling surface discontinuity for disabling the cart against further wheeled motion.

2. The cart of claim 1, wherein said disabling means comprises a first braking member concentrically and rigidly mounted on said cart wheel for rotation therewith, said first braking member being provided with a plurality of holes spaced about its periphery;

a second braking member mounted on said inner member means and adapted to selectively register with one of said holes in said first braking member to prevent further rotational movement of said wheel when in engagement with said hole;

and actuating means connected to said hollow leg and said inner member means and responsive to predetermined downward travel of said inner member means relative to said hollow leg for causing said second braking member to engage said holes in said first braking member.

3. The cart of claim 2 wherein said actuating means further comprises biasing means for urging said second braking member into engagement with said first braking member;

retaining means for normally restraining said second braking member from engagement with said first braking member;

and release means for releasing said retaining means in response to predetermined downward travel of said inner member means.

4. The cart of claim 1, where said inner member means comprises an upper shaft and a lower link pivotally connected to the lower end of said shaft, the pivotal connection being normally confined within said hollow leg;

said axle means being fixed to the lower end of said lower link;

and stop means for limiting the upward movement of said inner member means relative to said hollow leg; downward movement of said inner member means relative to said hollow leg beyond a predetermined distance causing said pivotal connection to emerge from the lower end of said hollow tube and causing said inner member means to collapse at said connection, thereby disabling the cart.

References Cited

UNITED STATES PATENTS 1,671,774   5/1928   McIntosh ---------- 188—69 X
3,090,470   5/1963   Abrams ---------- 188—69 X MILTON BUCHLER, *Primary Examiner.*

G. E. HALVOSA, *Examiner.*